(12) United States Patent
Kara et al.

(10) Patent No.: US 12,477,189 B2
(45) Date of Patent: Nov. 18, 2025

(54) MULTI-CONTENT DELIVERY NETWORK LOAD BALANCING OVER CONTENT STEERING SERVER

(71) Applicant: Synamedia Viviedtec Holdings, Inc., Lawrenceville, GA (US)

(72) Inventors: Burak Kara, Rennes (FR); Gwendal Brieuc Christian Simon, Rennes (FR)

(73) Assignee: SYNAMEDIA VIVIEDTEC HOLDINGS, INC., Lawrenceville, GA (US)

( * ) Notice: Subject to any disclaimer, the term of this patent is extended or adjusted under 35 U.S.C. 154(b) by 14 days.

(21) Appl. No.: 18/385,365

(22) Filed: Oct. 30, 2023

(65) Prior Publication Data

US 2025/0142178 A1 May 1, 2025

(51) Int. Cl.
- *G06F 15/16* (2006.01)
- *H04N 21/6405* (2011.01)
- *H04N 21/647* (2011.01)

(52) U.S. Cl.
CPC ... *H04N 21/64792* (2013.01); *H04N 21/6405* (2013.01)

(58) Field of Classification Search
CPC .............. H04N 21/64792; H04N 21/6405
USPC ......................................................... 709/231
See application file for complete search history.

(56) References Cited

U.S. PATENT DOCUMENTS

| | | | |
|---|---|---|---|
| 9,191,465 B2 | 11/2015 | Watson et al. | |
| 9,979,657 B2 | 5/2018 | Batrouni et al. | |
| 11,057,446 B2 | 7/2021 | Shribman et al. | |
| 11,070,485 B2 | 7/2021 | Deek et al. | |
| 11,233,768 B1 * | 1/2022 | Flack | H04L 61/4511 |
| 11,606,309 B2 | 3/2023 | Deek et al. | |
| 11,641,410 B1 * | 5/2023 | Uthaman | H04L 43/50 |
| | | | 709/218 |
| 11,741,930 B2 | 8/2023 | Gala et al. | |
| 11,956,293 B1 * | 4/2024 | Heikkinen | H04L 65/80 |

(Continued)

FOREIGN PATENT DOCUMENTS

EP      3257233 B1      6/2020

OTHER PUBLICATIONS

Bentaleb, Abdelhak, et al. "Which CDN to Download From? A Client and Server Strategies." Proceedings of the 2nd Mile-High Video Conference. 2023. (Copy of Abstract Submitted).

(Continued)

*Primary Examiner* — Alan S Chou
(74) *Attorney, Agent, or Firm* — Fernando & Partners, LLP (57) ABSTRACT

Techniques for multi-Content Delivery Network (CDN) load balancing are performed at a content steering server in a multi-CDN system, where the multi-CDN system includes a plurality of CDNs serving a plurality of clients. The content steering server receives from a first CDN of the plurality of CDNs a request to switch a first number of clients in the multi-CDN system. In response to receiving the request, the content steering server facilitates negotiations between the first CDN and at least one CDN of the plurality of CDNs, including determining a second number of clients in the multi-CDN system to be switched. Upon successful negotiations, the content steering server triggers the first CDN and the at least one CDN to switch the second number of clients between the first CDN and the at least one CDN.

20 Claims, 7 Drawing Sheets

(56) References Cited

U.S. PATENT DOCUMENTS

| | | | |
|---|---|---|---|
| 2021/0152882 A1* | 5/2021 | Xie | H04N 21/2225 |
| 2022/0417610 A1* | 12/2022 | Chandrashekar | H04N 21/44209 |
| 2023/0199247 A1* | 6/2023 | Fu | H04L 67/568 709/219 |
| 2024/0333784 A1* | 10/2024 | Reznik | H04L 65/612 |

OTHER PUBLICATIONS

DASH-IF. Candidate Technical Specification: Content Steering for DASH. [Online] Available: https://dashif.org/docs/DASH-IF-CTS-00XX-Content-Steering-Community-Review.pdf. Accessed on Aug. 18, 2023.

Pathan, M., C. Vecchiola, and R. Buyya. "Load and Proximity Aware Request-Redirection for Dynamic Load Distribution in Peering CDNs. In proc." OTM 2008 Confederated International Conferences: CoopIS, DOA, GADA, IS, and ODBASE 2008.

Seeliger, Robert, Stefan Pham, and Stefan Arbanowski. "End-to-end Optimizations for Green Streaming." Proceedings of the First International Workshop on Green Multimedia Systems. 2023.

Silhavy, Daniel, et al. "Dynamic CDN Switching-DASH-IF Content Steering in dash. js." Proceedings of the 2nd Mile-High Video Conference. 2023.

Mola et al., "Predictive CDN Selection for Video Delivery Based on LSTM Network Performance Forecasts and Cost-Effective Trade Offs", IEEE Transactions on Broadcasting, IEEE Service Center, vol. 67, No. 1, Mar. 2021, pp. 145-158.

Extended European Search Report for corresponding EP Appl. No. 24201768.9 dated Mar. 21, 2025.

* cited by examiner

MULTI-CONTENT DELIVERY NETWORK LOAD BALANCING OVER CONTENT STEERING SERVER

TECHNICAL FIELD

The present disclosure relates generally to multimedia content delivery and, more specifically, to methods, devices, and systems of multi-Content Delivery Network loading balancing.

BACKGROUND

To deliver content to consumers, video service providers increasingly rely on multiple vendors and implement multi-Content Delivery Network (CDN) strategies on various independent platforms, e.g., each of the vendors configuring independent CDNs. To align with this business trend, the technical communities responsible for developing the main Adaptive Bit-Rate protocols (e.g., HTTP Live Streaming (HLS) and Dynamic Adaptive Streaming over HTTP (DASH)) have designed a system where every end-user client regularly contacts a steering server (also referred to hereinafter as a content steering server or CSS) to obtain instructions on which CDN to use for data retrieval. The steering server is expected to implement intelligent load balancing to route content consumers the CDNs, optimizing certain high-level performance metrics.

The steering server typically implements a global strategy based on two factors: (1) the high-level business requirements of the multiple CDNs and (2) the reports it collects from client Quality of Experience (QoE). In the current implementation of various multi-CDN steering systems, the steering server exclusively takes into account the client's QoE. As such, at present, the steering server does not consider any updates to CDN status and/or requirements for load balancing. However, CDN requirements inherently vary for at least two reasons. First, a CDN's performance is influenced by the number of sessions it serves. For instance, the energy efficiency of a CDN depends on the number of online servers and sessions it handles. Second, the total capacity that certain CDNs can provide at any given time depends on external usage. For example, a private CDN can only offer to the steering server what remains after the delivery of priority channels. Currently, the CDNs are unable to update their requirements due to their lack of a means to communicate with the steering server. Specifically, the CDNs cannot express their preference to handle more or less traffic. Consequently, the existing systems lack a mechanism to facilitate negotiations between elements in the multi-CDN system, e.g., the CDNs and the steering server, in order to implement load balancing that meets the CDNs' needs.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Methods, devices, and systems described herein enable and facilitate communications and negotiations between Content Delivery Networks (CDNs) in a multi-CDN distribution strategy with content steering. The establishment of such communications allows a CDN to tune its traffic load through negotiations with other CDN(s). For example, when a CDN needs to offload a portion of its traffic load, it can negotiate with other CDNs through the communication paths. In another example, when a CDN has the capacity to handle more traffic (i.e., onloading), it can negotiate with other CDN(s) through the communication paths and determine the strategy for handling additional traffic. In some embodiments, the negotiations are operated through the steering server, which possesses complete awareness of participants in the system and is responsible for making the ultimate decisions regarding traffic offloading or onloading. As such, a CDN in the multi-CDN system can use internal statistics (e.g., power efficiency, profitability) to act in its best interest and strategically requests the traffic load adjustments. Also in the multi-CDN system, the steering server in accordance with various embodiments, can exploit the negotiation phase for dynamic balancing to optimize CDN usage.

In accordance with various embodiments, a multi-CDN load balancing method is performed at a content steering server in a multi-CDN system, where the multi-CDN system includes a plurality of CDNs serving a plurality of clients. The method includes receiving from a first CDN of the plurality of CDNs a request to switch a first number of clients in the multi-CDN system. In response to receiving the request, the method further includes facilitating negotiations between the first CDN and at least one CDN of the plurality of CDNs, including determining a second number of clients in the multi-CDN system to be switched. The method also includes, upon successful negotiations, triggering the first CDN and the at least one CDN to switch the second number of clients between the first CDN and the at least one CDN.

Example Embodiments

As described above, the industry often assumes that Content Delivery Networks (CDNs) have unlimited capacity to serve content. Consequently, they tend to view negotiating onloading and/or offloading between CDNs as unnecessary, even for reasons like energy efficiency. Currently, the content steering server (also referred to hereinafter as the CSS or the steering server) possesses some knowledge about global fixed requirements and capacity. However, there is no further communication between the steering server and the CDNs in the steering protocol specifications. Previous work has either omitted a capacity limit in the CDN, which may be true for public CDNs but not for private CDNs, or assumed that the CDN requirements do not change over time. Consequently, most proposals consider that the steering server applies specific CDN load balancing policies for traffic. In other words, in the current state of the art, the only parameter the steering server deals with is the global monetary agreement between the steering server and the CDN, while the requirements and capacity of each CDN are treated as fixed constraints.

Unlike previous approaches, a steering server described herein exploits a negotiation phase between CDNs to dynamically redistribute loads among multiple CDNs. In accordance with various embodiments, a CDN uses internal statistics (e.g., power efficiency, profitability, operational requirements, and/or business requirements) to consider its optimal course of action, strategically adjusting traffic loads and requesting load modifications. As a result, the negotiation phase enables dynamic load balancing that optimizes the utilization of CDNs in a multi-CDN system.

Figure 1:
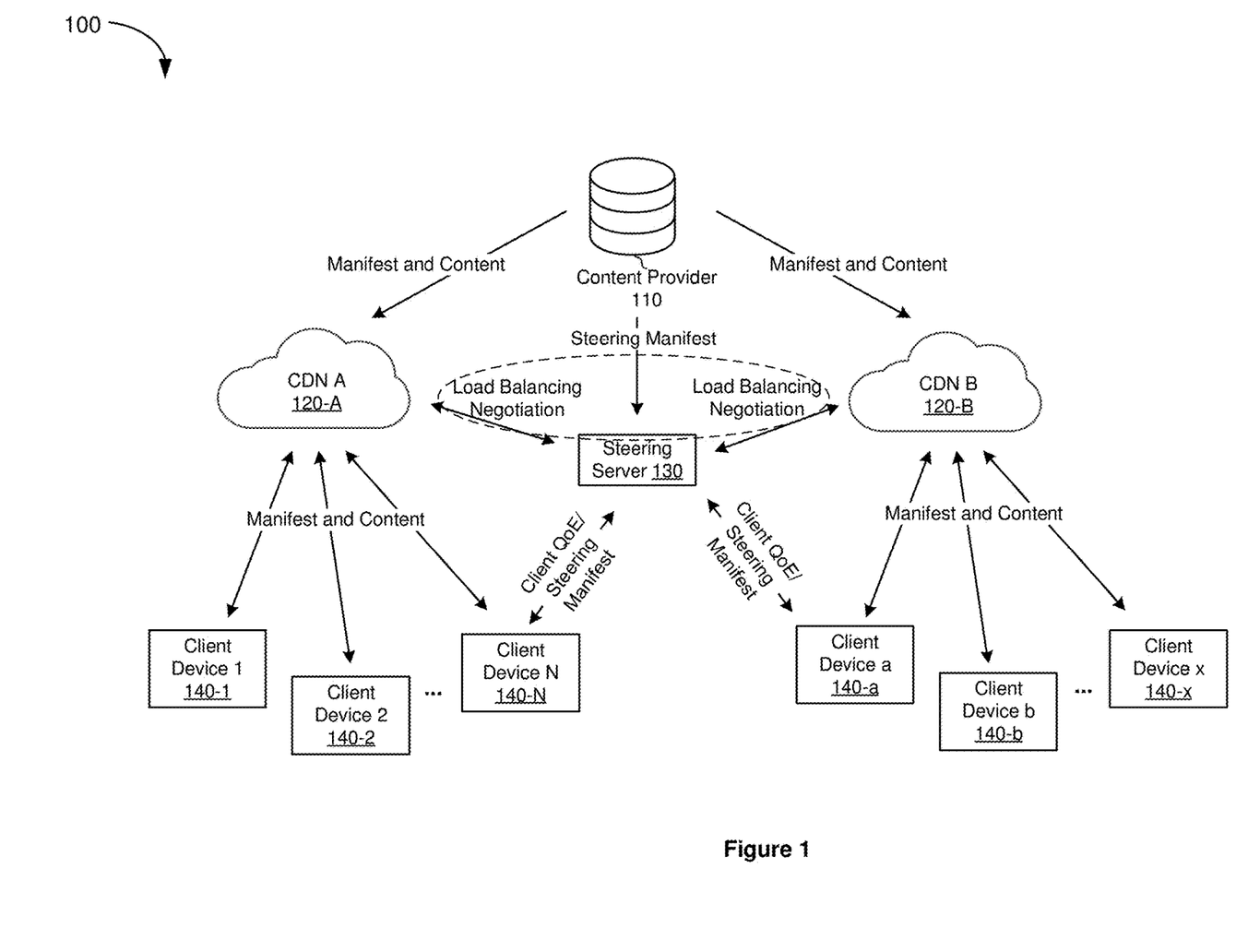
FIG. 1 is a block diagram of an exemplary multi-Content Delivery Network (CDN) system with a content steering server, in accordance with some embodiments.

FIG. 1 is a diagram illustrating an exemplary multi-CDN system 100 in accordance with some embodiments. In some embodiments, the exemplary system 100 includes a content provider 110, multiple CDNs 120 (e.g., CDN A 120-A and CDN B 120-B, etc.), a steering server 130, and a plurality of client devices 140, e.g., client device 1 140-1, client device 2 140-2, . . . , client device N 140-N, client device a 140-a, client device b 140-b, . . . , client device x 140-x, etc. Though FIG. 1 illustrates two CDNs 120, in various embodiments, more than two CDN 120 are involved in the multi-CDN system 110. For the sake of simplicity and without loss of generality, one CDN 120 (e.g., CDN A 120-A) for initiating communications and negotiations is referred to hereinafter as "alpha" and another CDN 120 (e.g., CDN B 120-B) as a partner in the communications and negotiations is referred to hereinafter as "beta". Likewise, though FIG. 1 illustrates the steering server 130 as a single server, one or more servers hosting the steering server 130 can be implemented in place of or in conjunction with the configurations shown in FIG. 1.

Content providers (e.g., the content provider 110) often use multiple CDNs 120 to distribute their content to end users at the plurality of client devices 140. They can upload a copy of their catalogue to each of the CDNs 120, or more commonly have the CDNs 120 pull the content from a common origin, e.g., the CDNs 120 pulling manifests and content as shown in FIG. 1. CDNs enable various video streaming services to deliver media content (e.g., video, audio, text, etc.) over the Internet with reduced latency and improved quality. To meet viewers' quality of experience (QoE) requirements, multi-CDN systems leverage the multiple CDNs 120 from various providers (e.g., multiple third-party CDNs or a combination of an in-house private CDN and a third-party CDN) to enhance performance, expand geographic coverage, and minimize outages. The media content is often delivered via an adaptive bitrate streaming format, such as Dynamic Adaptive Streaming over HTTP (DASH), HTTP Live Streaming (HLS), and/or other formats pursuant to various protocols and standards. Media segments and manifest files (e.g., metadata for the content and the delivery of the content) are hosted on a respective CDN 120 and, from there, are delivered to the client devices 140.

An essential aspect of multi-CDN solutions involves making decisions to select a best-performing CDN based on periodic measurements of CDNs 120 and the client devices 140 (e.g., video players, mobile devices, TVs, and/or set-top-boxes, etc., also referred to hereinafter as the clients). To enable the selection of the best-performing CDN, alternate URLs are generated, one for each CDN 120, pointing to identical content. The client devices 140 can access alternate URLs in the event of content delivery issues. Content steering thus describes a deterministic capability for a content distributor to switch a client's content source, at startup or midstream, through the steering server 130, e.g., a remote steering service.

For instance, in DASH, content steering is accomplished by having a DASH client (e.g., a respective client device 140) periodically access the content steering server 130 to retrieve a steering manifest. The steering manifest instructs the client device 140 about the availability and priority of content sources. Relevant portions of an exemplary steering manifest are shown in diagram 200 in FIG. 2. It should be noted that though FIG. 2 illustrates exemplary manifest in DASH format, the steering information exchanges in the multi-CDN system can be in any other formats pursuant to various adaptive bitrate streaming protocols and standards, including, but are not limited to, DASH, HLS, HTTP Dynamic Streaming (HDS), etc.

Figure 2:
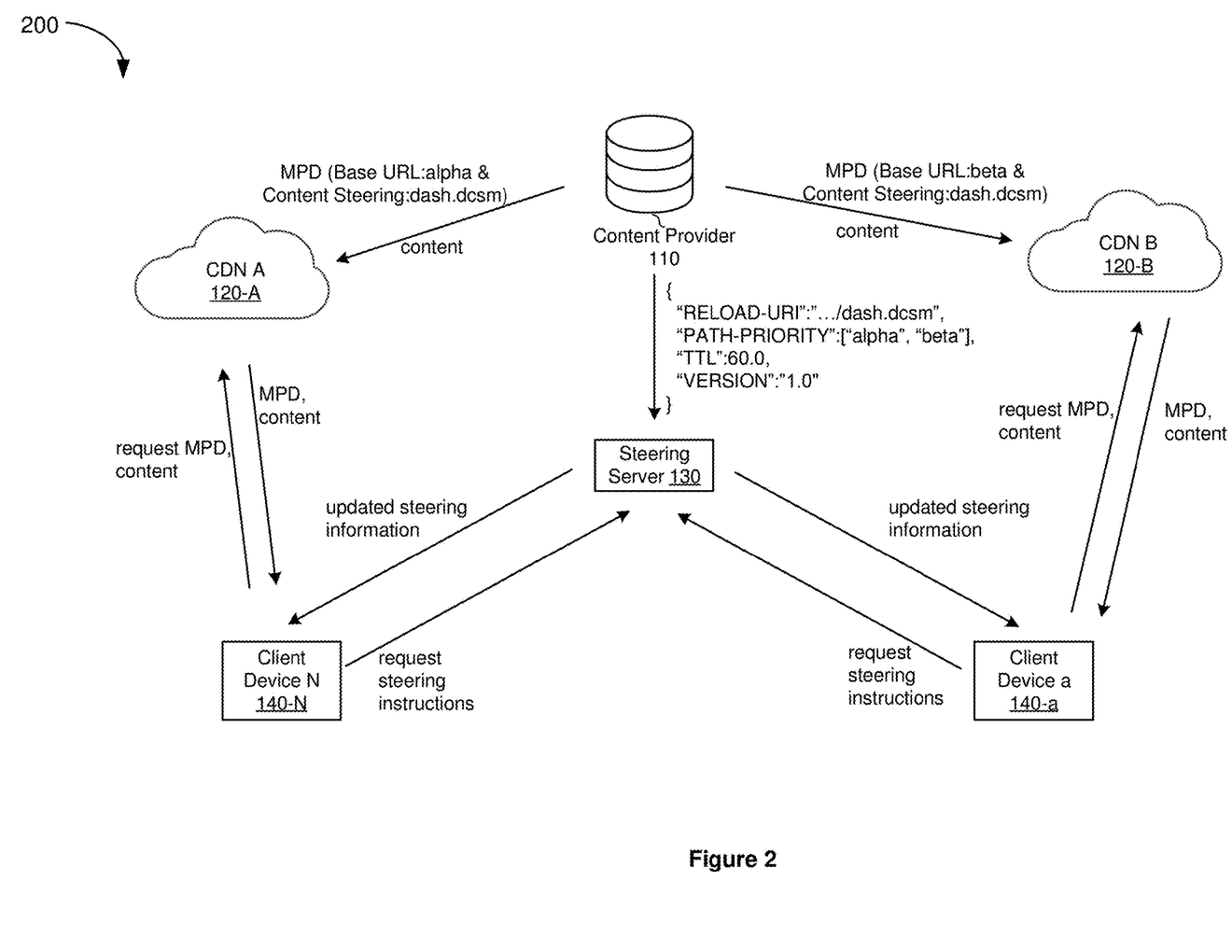
FIG. 2 is a diagram illustrating manifest and steering information exchanges in the exemplary multi-CDN system, in accordance with some embodiments.

In FIG. 2, the content provider 110 specifies in the steering manifest elements such as RELOAD-URI, PATHWAY-PRIORITY, TTL, and VERSION of the steering manifest. RELOAD-URI specifies the URI the client device uses the next time it accesses and obtains the manifest from the steering server 130, e.g., " . . . dash.dcsm" as shown in FIG. 2. PATHWAY-PRIORITY is an array of URLs to the CDNs 120. Elements in the PATHWAY-PRIORITY array are ordered by preference of the BaseURL to be selected, with the first being the most preferred, e.g., an array "alpha, beta" representing the most preferred CDN being CDN A 120-A followed by CDN B 120-B. TTL specifies how many seconds the client device waits before reloading the steering manifest, e.g., 60 seconds.

Also as shown in FIG. 2, the content provider 110 generates MPDs that includes BaseURLs to CDN A 120-A and CDN B 120-B, as well as content steering information, such as an address where the clients can access the steering server 130. Both MPDs and segments of the media content are pulled or uploaded to the CDNs 120. When a respective client device 140 obtains the MPD before making a content request from a respective CDN 120, the respective client device 140 locates the content steering server URL specified in the MPD and uses the information to request steering instructions from the steering server 130 before requesting the first segment from the respective CDN 120. In response to receiving the request, the steering server 130 provides the updated steering information to the respective client device 140 so that the respective client device 140 can request the content from the CDN 120 specified in the updated steering information.

Figure 3:
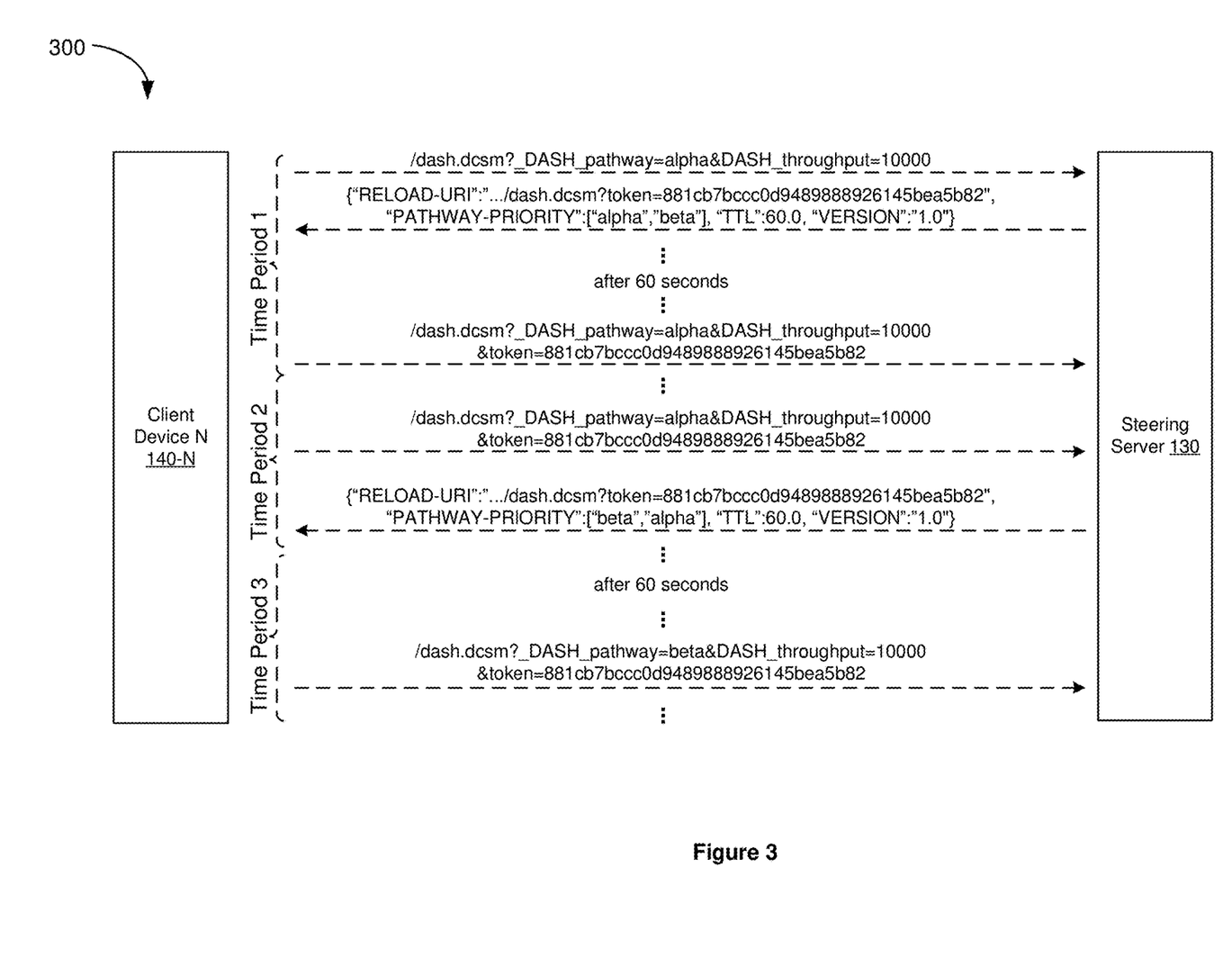
FIG. 3 is a diagram illustrating interactions between a client device and the exemplary content steering server, in accordance with some embodiments.

For example, FIG. 3 is a diagram 300 illustrating exemplary interactions between client device N 140-N and the steering server 130. In FIG. 3, during a first time period, client device N 140-N sends a request to the steering server 130, e.g., "/dash.dcsm", and attaches parameters such as _DASH_pathway for the currently selected CDN and _DASH_throughput for the current prediction of media download throughput observed by client device N 140-N. In response, as shown in FIG. 3, the steering server 130 sends updated steering information to client device N 140-N. In particular, PATHWAY-PRIORITY specifies the most preferred CDN as "alpha" (e.g., CDN A 120-A in FIGS. 1 and 2) followed by "beta" (e.g., CDN B 120-B in FIGS. 1 and 2).

FIG. 3 also shows that periodically, e.g., every 60 seconds according to the duration specified in TTL, client device N 140-N sends another request to the steering server 130 and attaches the same parameters, e.g., _DASH_pathway for the currently selected CDN and _DASH_throughput. By the end of the second time period, the steering server 130 sends updated steering information to client device N 140-N specifying updated PATHWAY-PRIORITY, e.g., with the most preferred being "beta" (e.g., CDN B 120-B in FIGS. 1 and 2), followed by "alpha" (e.g., CDN A 120-A in FIGS. 1 and 2). As such, before the end of the second time period, CDN A 120-A (FIGS. 1 and 2) has the priority to provide media content to client device N 140-N, and after receiving the updated steering information at the end of the second time period, CDN B 120-B (FIGS. 1 and 2) has the priority to provide media content to client device N 140-N.

Referring back to FIG. 1, as illustrated in FIGS. 2 and 3, without the communications and negotiations among the CDNs, the steering server 130 receives high-level business requirements from the content provider 110 and performs content steering based on QoE reported by the client devices 140, e.g., values of _DASH_throughput observed by the client devices 140. As such, without the communication paths between the CDNs 120 and the steering server 130, the CDNs 120 cannot communicate their loads and evolving requirements to the steering server 130 for load balancing. In accordance with various embodiments, as indicated by the oval in dashed line in FIG. 1, the load balancing negotiation mediated by the steering server 130 between CDN A 120-A and CDN B 120-B allows the CDNs 120 to express their desire to handle more or less traffic. Further, the steering server 130, in accordance with various embodiments, acts as a mediator during negotiations to ensure uninterrupted content delivery. Because there is no direct communication between the CDNs 120 and the CDNs 120 already have the address of the steering server 130 (e.g., specified in the MPDs as shown in FIG. 2), the methods described herein in accordance with various embodiments obviate the need for a specific protocol to deal with the interconnection of the CDNs 120. For example, the CDNs 120 can communicate with the steering server 130 using HTTP requests when necessary, including, but not limited to GET and POST.

Figure 4:
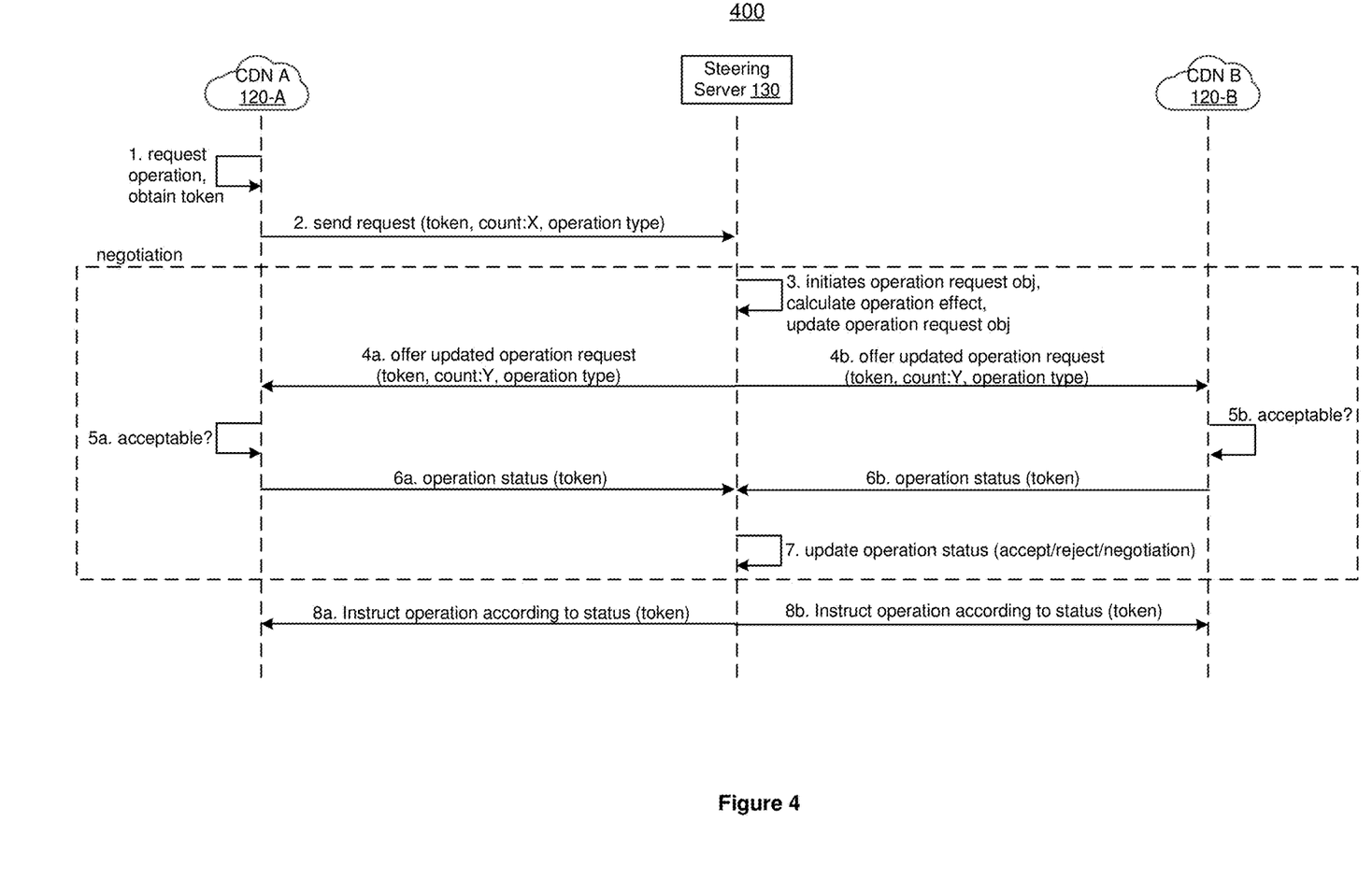
FIG. 4 is a sequence diagram illustrating a communication process for multi-CDN load balancing over the exemplary content steering server, in accordance with some embodiments.

Turning to FIG. 4, FIG. 4 is a sequence diagram 400 illustrating a communication process for multi-CDN load balancing over the content steering server 130. In some embodiments, the communication process begins with CDN A 120-A observing its statistics (e.g., power efficiency, profitability, operational requirements, geolocation conditions, traffic variations, and/or business requirements, etc.) that are related to the number of clients it currently service, and deciding whether to request an operation to switch a number of clients in the multi-CDN system, e.g., offloading or onloading traffic to improve its statistics. For example, as one operational requirement, a server hosting CDN A 120-A is scheduled to be shut down for an upgrade operation, or the network operator informs CDN A 120-A about a maintenance operation. In another example, as one business requirement, CDN A 120-A plans to increase or decrease the volume it delivers due to a commitment with another operator. In some embodiments, CDN A 120-A learns the behaviors of a partner CDN, e.g., CDN B 120-B and requests operations having a high chance of acceptance from CDN B 120-B. In some other embodiments, CDN A 120-A predicts its future load and/or internal problems (e.g., a problem in one of the datacenters where the edge-server(s) are located) and initiates a request based on the prediction.

In some embodiments, the steering server 130 provides the prediction information. For example, using session information from the CDNs 120, the steering server 130 predicts feature load and suggests the CDN(s) 120 to take action(s), e.g., deploying more edge-servers or shutting down edge-servers. In another example, using QoE feedback from the client devices that indicates possible performance issues, the steering server 130 suggests the CDN(s) 120 to shut down for maintenance. In some embodiments, the steering server 130 predicts changes to the CDNs 120 based on learnings of past performance. The learning can be any kind in the art, e.g., supervised or unsupervised. In some embodiments, using reinforcement learning, the steering server 130 learns the chances of acceptance or rejection during negotiations based on previous traffic variations. In such cases, the steering server 130 pre-triggers the communications when the steering server 130 anticipates changes to the CDNs 120. For instance, the pre-trigger message does not need to include the number of clients to be offloaded or onloaded. Instead, it can include experienced_QoE_score where the respective CDN 120 can take actions depending on the score.

In step 1, once the request of an operation is initiated, the negotiation process starting by CDN A 120-A obtaining a token. In some embodiments, a token is an object associated with a unique identifier that identifies the operation. As such, the token is also referred to hereinafter as the operation request object or the operation object. In the following steps, CDN A 120-A as well as the steering server 130 use the token to track and update the operation process.

In step 2, CDN A 120-A sends an operation request to the steering server 120 to initiate negotiations facilitated by the steering server 120. In some embodiments, the operation request includes the token obtained by CDN A 120-A, the number of clients that CDN A 120-A desires to offload or onload, e.g., count: X, and an operation type indicating whether the requested operation is offloading (e.g., operation type 1) or onloading (e.g., operation type 2) a number of clients in the multi-CDN system, e.g., 1 indicating offloading and 2 indicating onloading. In some embodiments, CDN A 120-A maintains operation state fields, including, but are not limited to, operation status and the token, e.g., operation status value 1 indicating an operation requested in the negotiations and operation status value 2 indicating an offer being provided in the negotiations. In some embodiments, the steering server 130 determines the operation status while mediating the negotiations and shares the operation status with the CDNs 120, e.g., 3 representing offer or request accepted, 4 representing work-in-progress, 5 representing the completion of client re-assignments, −1 representing offer or request rejected, and −2 representing aborted, etc. In some embodiments, the steering server also keeps some operation status internally during the negotiations, e.g., 0 representing receiving a counter offer as a response during the negotiations.

In some embodiments, upon receiving the operation request, the steering server 120 facilitates the negotiations by internally calculating the effect of the operation request in step 3, e.g., determining the number of clients in the multi-CDN system impacted, affected, and/or to be switched over. Depending on the calculations, the steering server 130 updates the operation request to further the negotiation as shown in FIG. 4, or aborts the operation when the steering server 130 determines that the requested operation has no impact on the current load distribution. In the case of aborting the operation, in some embodiments, the steering server 130 informs CDN A 120-A that the operation is aborted. Further, in some embodiments, in the case of aborting the operation, the steering server 130 accepts no further messages about the operation request from CDN A 120-A, e.g., discarding further operation requests including the token.

In some embodiments, calculating the effect of the operation request further includes determining the number of buckets affected by the request. In bucket-based approach, clients are grouped into N buckets, where N can be any number. The steering server 130 initially has a set of buckets (e.g., an indexed array) mapped to the CDNs 120 based on the initial load balancing and/or business requirements. For example, assuming the steering server 130 has 64 buckets, the business requirement is to have equal distribution between CDN A 120-A and CDN B 120-B. Accordingly, the steering server 130 maps 32 buckets to CDN A 120-A and 32 buckets to CDN B 120-B, e.g., storing in a mapping table on the steering server 130. In some embodiments, the steering server 130 identifies the number buckets that includes the closest number of clients to the initially requested by CDN A 120-A and updates the number of affected clients based on the number of clients in the affected buckets, e.g., changing count from X in the request from CDN A 120-A to Y in the message to CDN B 120-B, where Y is set to be the number of clients in affected buckets multiplied by the number of buckets affected or the summation of the number of clients in affected buckets. In some embodiments, to keep the mappings between clients and CDNs 120, the steering server 130 does not calculate the effect. In such embodiments, the steering server 130 directly offer the operation to CDN B 120-B without calculating the operation effect in step 3, e.g., setting the number of clients affected to be the same value as the requested count. In some embodiments, in the case of the steering server 130 determining that no bucket can be remapped, the steering server 130 sends an operation status indicating aborted to the CDNs 120.

In some embodiments, the steering server 130 maintains and/or tracks the states of the negotiations, which include, but are not limited to, a sender field indicating the sender of the request such as the requester CDN A 120-A, a responder field indicating a responder/receiver to the request or the partner to the requester in the negotiations such as the responder CDN B 120-B, a counter representing the number of affected clients requested or set by the steering server during the negotiations (e.g., count: X or count: Y), the token identifying the request, a status code indicating the progress of the negotiations, and various status codes indicating the readiness of the CDNs 120 to perform the operation. For example, among the various status codes, a sender_ready field indicates whether CDN A 120-A is ready to switch the number of clients agreed upon during the negotiation facilitated by the steering server 130, and a receiver_ready field indicates whether CDN B 120-B is ready to switch the number of clients agreed upon during the negotiation facilitated by the steering server 130.

In some embodiments, the steering server 130 updates the operation request to further improve the load balancing, e.g., determining a different number of clients to be offloaded or onloaded, and informs CDN A 120-A and CDN B 120-B about the updated operation request. For example, in step 4a and step 4b, the steering server 130 offers an updated operation request to CDN A 120-A and CDN B 120-B respectively, e.g., sending a request including the token, count: Y, and the operation type to CDN A 120-A in step 4a and to CDN B 120-B in step 4b. In some embodiments, the selection of the partner for negotiation is specified in the request from CDN A 120-A, e.g., in the URL from alpha, specifying 'partner=beta'. In some other embodiments, the steering server 130 decides the best CDN to transfer a given request based on historical negotiation statistics, history of performance, and its understanding of the context. In such embodiments, the request from CDN A 120-A omits the partner parameter in accordance with some embodiments. Alternatively, in some embodiments, the steering server 130 takes the partner value specifies in the URL into consideration, but overwrites the value when the steering server 130, based on history and context, determines forwarding the operation request to a different partner CDN increases the chance of successful negotiations, e.g., considering 'partner=beta' in the request but forwarding the request to CDN C instead of CDN B 120-B.

In some embodiments, CDN A 120-A and CDN B 120-B evaluate the updated operation request in steps 5a and 5b, e.g., the messages generated by the steering server 130 during the negotiations facilitated by the steering server 130 trigger the CDNs 120 to evaluate the updated operation request. In some embodiments, CDN A 120-A and CDN B 120-B simulate the operation request to determine whether to accept, reject, or negotiate based on the simulated statistics (e.g., indicating a different number of clients for the negotiations). In some other embodiments, based on it is configuration, CDN B 120-B accepts the operation request without any evaluation process. In some embodiments, based on the evaluation, CDN A 120-A and CDN B 120-B respond to the steering server 130 in steps 6a and 6b with the operation status of the CDNs 120. In various embodiments, the operation status of the CDNs 120 indicates accepted, rejected, and/or a counteroffer for further negotiation. In some embodiments, the responses to the steering server 130 further indicate whether the CDN(s) 120 are busy, thus are not available for any operation requests. Based on the received operation status, the steering server 130 updates the operation request object with the operation status in step 7. In some embodiments, as indicated by the box with dashed borders, for further negotiations, steps 3 through 7 are repeated.

For instance, as described in connection with step 2, upon receiving a request from CDN A 120-A with the operation status being 1 (indicating an operation requested), the steering server 130 creates the operation request object internally and sets the operation status to 1. Once the steering server 130 calculates the impact of the requested operation, the steering server 130 updates the operation status of the operation request object to 2, indicating offering an updated count to the CDNs 120 for negotiation. It is possible that one of the CDNs 120 accepts the updated count but the other responds to the steering server with a counter offer. In response to receiving the counter offer from at least one of the CDNs 120, the steering server 130 updates the operation status to 0 indicating receiving the counter offer as a response during the negotiation. The receipt of the counter offer triggers the performance of steps 3 through 7 illustrated in FIG. 4 and the steering server 130 tracks and updates the operation status accordingly. The negotiations end when the steering server 130 receives from both CDNs 120 that the offer has been accepted and updates the status to 3 indicating the successful outcome of the negotiations. Alternatively, the negotiations end when the steering server 130 sets the operation status to −2 indicating aborted negotiations or −1 indicating offer rejected.

In steps 8a and 8b, the steering server 130 instructs CDN A 120-A and CDN B 120-B to perform operations according to the operation status. In some embodiments, in the case of CDN A 120-A and CDN B 120-B accepting the operation, the steering server 130 informs the CDNs 120 that the other CDN has accepted, waits for the ready signal from the CDNs 120 (e.g., starting up new edge servers based on the number of clients will be onloaded or shutting down edge servers if the operation is offloading), and forwards the clients from one CDN 120 to the partner CDN 120. In some embodiments, in order to forward the clients, the steering server 130 returns the steering manifest to the affected clients so that the clients can request the content from the CDN in the first index of the array. For example, each of Y number of clients previously received a steering manifest that specifies PATH-WAY-PRIORITY=[alpha, beta] and requested content from CDN A 120-A according to the steering manifest. Once the steering server 130 returns to each of Y number of clients an updated steering manifest that specifies updated priorities of URLs to the CDNs 120, e.g., PATHWAY-PRIORITY=[beta, alpha], each of Y number of clients can request the content from CDN B 120-B according to the updated steering manifest.

In some embodiments, during the preparation of the client switching, the CDNs 120 signal the steering server 130 that it is getting ready for the operation. For instance, after receiving the ready signal, in the case of the requested operation being offloading, the steering server 130 forwards the clients from CDN A 120-A to CDN B 120-B, e.g., according to bucket remapping of a number of clients from CDN A 120-A to CDN B 120-B. In another example, after receiving the ready signal, in the case of the requested operation being onloading, the steering server 130 forwards the clients from CDN B 120-B to CDN A 120-A, e.g., according to bucket remapping of a number of clients from CDN B 120-B to CDN A 120-A. After forwarding the clients, in some embodiments, the steering server 130 informs CDN A 120-A and CDN B 120-B with the operation done signal, and the CDNs 120 become available for new operation requests.

FIG. 4 illustrates the steering server 130 facilitating negotiations between two CDNs 120. In some embodiments, when requesting the operation, the requester or initiator CDN, e.g., CDN A 120-A in FIG. 4, specifies the other CDN participating in the negotiation, e.g., specifying the identifier or address of CDN B 120-B in the request in step 2. In such embodiments, the steering server 130 offers the operation request to the specified CDN. In some other embodiments, the steering server 130 facilitates negotiations among one requester and multiple responders, e.g., distributing one request to multiple CDNs 120.

For instance, when no CDN is specified or multiple CDNs are specified in the initial request, the steering server 130 offers the operation request to available CDNs or to the multiple CDNs specified in the request. The available CDNs can include any subset of the CDNs, including all available CDNs in the multi-CDN system. In such embodiments, the steering server 130 aggregates the responses from the multiple CDNs and determines the allocation of the number of clients among the multiple CDNs based on the responses. For instance, in the case of one requester CDN and two responder CDNs, assuming the requester CDN requests to offload X clients. The first responder CDN replies with count: Y, indicating that it has the capacity to onload Y clients; and the second responder CDN replies with count: Z, indicating that it has the capacity to onload Z clients, where the total of Y and Z equals or closely approximates X. In such cases, the steering server 130 aggregates the responses from the multiple responder CDNs and considers the responses from the multiple responders collectively before determining the operation status. For example, the steering server 130 can wait for a threshold amount of time to collect responses before performing the internal calculation for allocating the distribution of clients to the multiple responders.

Figure 5:
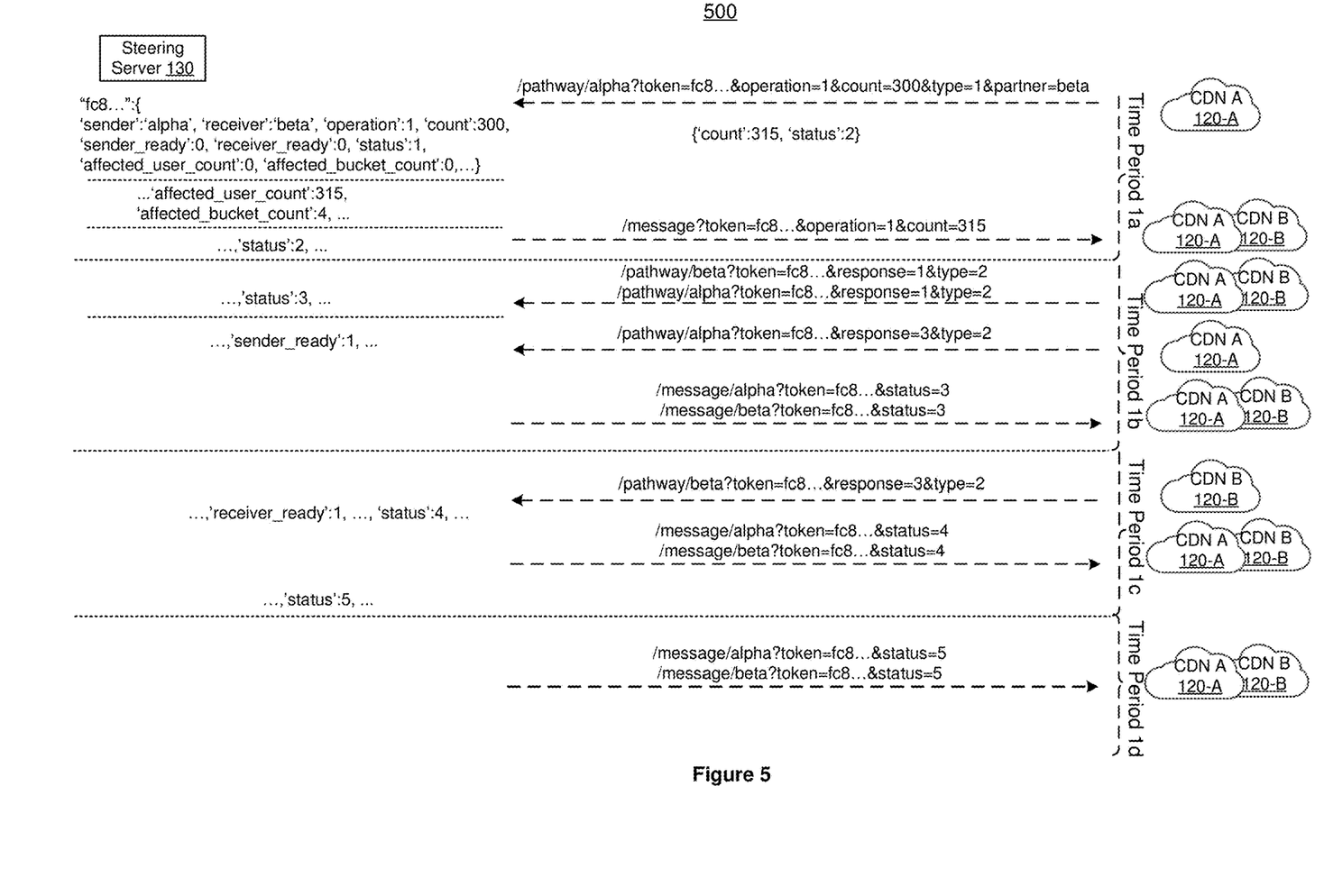
FIG. 5 is a diagram illustrating exemplary negotiation message exchanges and state tracking in multi-CDN load balancing over the exemplary content steering server, in accordance with some embodiments.

FIG. 5 is a diagram 500 illustrating exemplary negotiation message exchanges and state tracking in multi-CDN load balancing over the content steering server 130 in accordance with some embodiments. Specifically, applying the process illustrated in FIG. 4, diagram 500 illustrates a scenario where the steering server 130 facilitates the negotiations between CDN A 120-A and CDN B 120-B and CDN B 120-B accepts an offloading request from CDN A 120-A. As shown in FIG. 5, at the beginning of time period 1a, CDN A 120-A requests to offload X clients depending on its power efficiency for instance, e.g., following steps 1 and 2 in FIG. 4. CDN A 120-A obtains an operation request object with a unique token, which identifies the operation. In the following steps, CDN A 120-A uses the operation request object to track and update the negotiation progress.

In the operation request sent to the steering server 130, CDN A 120-A indicating the identities of the request initiator and the negotiation partner, e.g., alpha corresponding to CDN A 120-A and beta corresponding to CDN B 120-B. Additionally, in the operation request, CDN A 120-A specifies the unique identifier associated with the token (e.g., token=fc8 . . . ), the number of users to be offloaded (e.g., count=300), the operation type (e.g., operation=1 indicating an offloading request), and a message type (e.g., type=1 indicating the message being a request). In response to receiving the request, following step 3 in FIG. 4, the steering server 130 initializes an operation request object. In the following steps, the steering server 130 uses this object to track and update the states of the operation. For example, as shown in FIG. 5, the object is associated with the token "fc8 . . . " and has fields such as 'sender':'alpha', 'receiver': 'beta', 'operation':1, 'count':300, 'sender_ready':0, 'receiver_ready':0, 'status':1, 'affected_user_count':0, 'affected_bucket_count':0, etc.

In some embodiments, as described with reference to FIG. 4, the steering server 130 calculates the effect of the operation request based on statistics, e.g., based on the number of clients assigned to each CDN indicating the loads in the multi-CDN system. Based on the calculation, the steering server 130 updates the operation request object by updating the affected_user_count field and updating the affected_bucket_count field in accordance with some embodiments, e.g., updating "affected_user_count" from 0 to 315 and updating "affected_bucket_count" from 0 to 4. The steering server 130 then offers the updated operation request to CDN A 120-A and CDN B 120-B. CSS also updates the operation request object with status to 2 indicating an offer will be provided to the CDNs 120. At the end of time period 1*a*, following steps 4*a* and 4*b* in FIG. 4, the steering server 130 sends the offer to the CDNs 120, and the offer includes the unique identifier (e.g., token=fc8 . . . ), the number of users to be offloaded (e.g., count=315), and the operation type (e.g., operation=1 indicating the request is an offloading operation)

In time period 1*b*, following steps 5*a*-5*b* and 6*a*-6*b* in FIG. 4, the CDNs 120 evaluate the updated operation and accept, e.g., CDN B 120-B sending a message including the token (e.g., token=fc8 . . . ), indicating it is a response (e.g., type=2), and indicating accepting the operation request (e.g., response=1). Similarly, CDN A 120-A sending a message including the token (e.g., token=fc8 . . . ), indicating it is a response (e.g., type=2), and indicating accepting the operation request (e.g., response=1). Also in time period 1*b*, following step 7 in FIG. 4, the steering server 130 updates the operation request object by updating the status field to 3 indicating successful negotiations. Once CDN A 120-A sends a response (e.g., type=2) to the steering server 130 indicating its readiness to switch 315 clients to CDN B 120-B (e.g., response=3) and including the token, the steering server 130 updates sender_ready field to 1. Similarly, in time period 1*c*, once CDN B 120-B sends a response (e.g., type=2) to the steering server 130 indicating its readiness to onload 315 (e.g., response=3) and including the token, the steering server 130 updates receiver_ready field to 1. Following steps 8*a* and 8*b* in FIG. 4, the steering server 130 triggers the CDNs to switch 315 clients from CDN A 120-A to CDN B 120-B according to the operation status, e.g., status=3 in time period 1*b* indicating accepted, status=4 in time period 1*c* indicating starting the preparation of the client switching such as tuning the number of servers, and status=5 in time period 1*d* indicating completing the client re-assignments.

Figure 6:
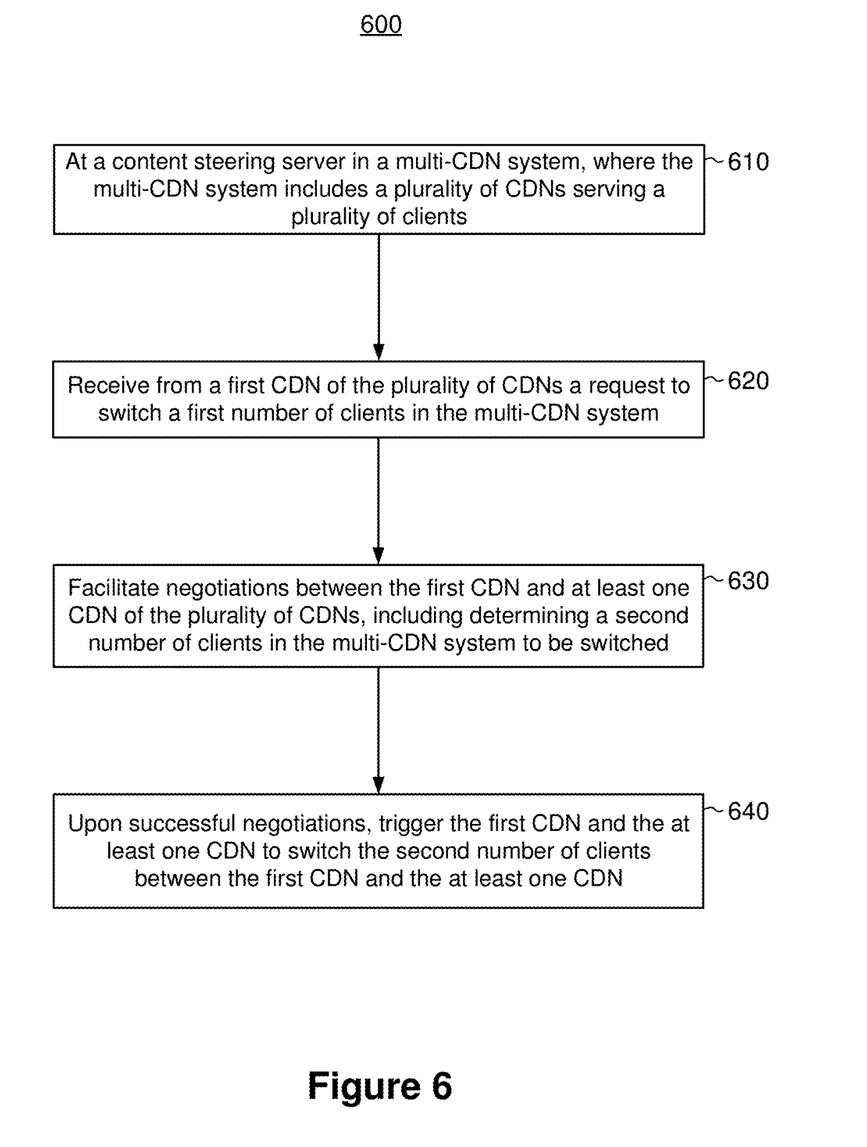
FIG. 6 is a flowchart illustrating a multi-CDN load balancing method over the exemplary content steering server, in accordance with some embodiments.

FIG. 6 is a flow chart illustrating a multi-CDN load balancing method 600 in accordance with some embodiments. In some embodiments, as represented by block 610, the method 600 is performed at a content steering server in a multi-CDN system, e.g., the steering server 130 in the multi-CDN system 100 shown in FIG. 1, where the multi-CDN system includes a plurality of CDNs serving a plurality of clients, e.g., the CDNs 120 in the multi-CDN system 100 server the plurality of clients 140 in FIG. 1. As represented by block 620, the content steering server receives from a first CDN of the plurality of CDNs a request to switch a first number of clients in the multi-CDN system. As represented by block 630, the content steering server facilitates negotiations between the first CDN and at least one CDN of the plurality of CDNs, including determining a second number of clients in the multi-CDN system to be switched. As represented by block 640, upon successful negotiations, the content steering server triggers the first CDN and the at least one CDN to switch the second number of clients between the first CDN and the at least one CDN.

Figure 7:
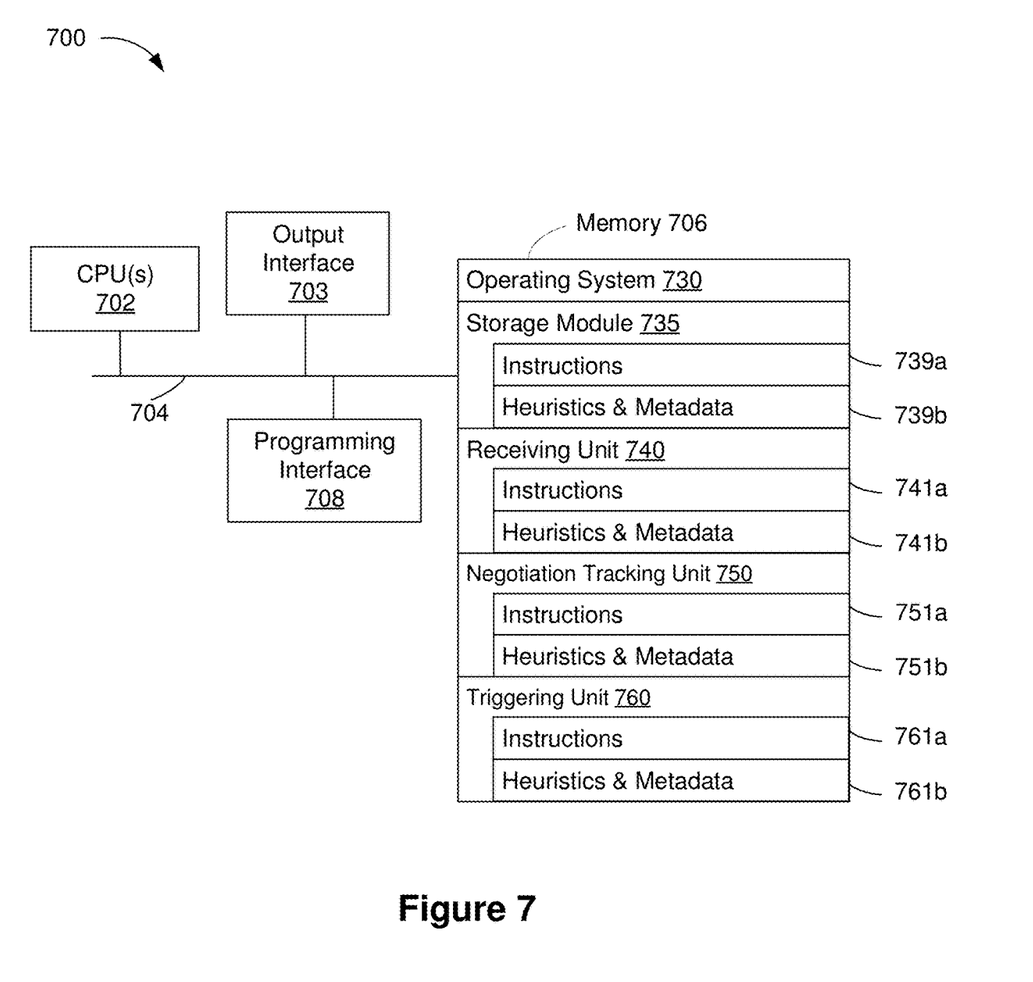
FIG. 7 is a block diagram illustrating a computing device for multi-CDN load balancing, in accordance with some embodiments.

FIG. 7 is a block diagram of a computing device 700 for multi-CDN load balancing in accordance with some embodiments. In some embodiments, the computing device 700 corresponds to the steering server 130 in FIGS. 1-5 and performs one or more of the functionalities described above with respect to the steering server. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703 (e.g., one or more network interfaces) for connecting to multiple CDNs and/or client devices in a multi-CDN system, a memory 706, a programming interface 708, and one or more communication buses 704 for interconnecting these and various other components.

In some embodiments, the communication buses 704 include circuitry that interconnects and controls communications between system components. The memory 906 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 735, a receiving unit 740, a negotiation tracking unit 750, and a triggering unit 760. In some embodiments, one or more instructions are included in a combination of logic and non-transitory memory. The operating system 730 includes procedures for handling various basic system services and for performing hardware dependent tasks.

In some embodiments, the storage module 735 is configured to store and/or manage states and/or status of negotiations, including bucket mappings. To that end, the storage module 735 includes a set of instructions 739*a* and heuristics and metadata 739*b*.

In some embodiments, the receiving unit 740 is configured to receive steering manifest information from content providers, client QoE from client devices, and/or load balancing negotiation messages from CDNs. To that end, the receiving unit 740 includes a set of instructions 741*a* and heuristics and metadata 741*b*.

In some embodiments, the negotiation tracking unit 750 is configured to facilitate negotiations between CDNs and track as well as update status, states, and/or negotiated load balancing parameters, e.g., count, operation type, affected user count, affected bucket count, receiver/sender readiness, etc. To that end, the negotiation tracking unit 750 includes a set of instructions 751*a* and heuristics and metadata 751*b*.

In some embodiments, the triggering unit 760 is configured to trigger the CDNs to switch clients according to the negotiation outcome, e.g., in the case of successful negotiating offloading a number of clients from CDN A to CDN B, steering manifests are updated so that the number of clients are served by CDN B instead of CDN A. To that end, the triggering unit 760 includes a set of instructions 761*a* and heuristics and metadata 761*b*.

Although the storage model 735, the receiving unit 740, the negotiation tracking unit 750, and the triggering unit 760 are illustrated as residing on a single computing device 700, it should be understood that in other embodiments, any combination of the storage model 735, the receiving unit 740, the negotiation tracking unit 750, and the triggering unit 760 can reside in separate computing devices in various embodiments. For example, in some embodiments, each of the storage model 735, the receiving unit 740, the negotiation tracking unit 750, and the triggering unit 760 resides on a separate computing device.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a content steering server in a multi-CDN system, wherein the multi-CDN system includes a plurality of CDNs serving a plurality of clients:
receiving from a first CDN of the plurality of CDNs a request to switch a first number of clients in the multi-CDN system;
facilitating negotiations between the first CDN and at least one CDN of the plurality of CDNs, including determining a second number of clients in the multi-CDN system to be switched and tracking the negotiations using an operation object obtained by the first CDN, wherein the operation object records the first CDN as a sender of the request, the at least one CDN as a respective responder to the request, the first number of clients, and status indicating progress of the negotiations and readiness of the first CDN and the at least one CDN; and
upon successful negotiations, triggering the first CDN and the at least one CDN to switch the second number of clients between the first CDN and the at least one CDN.

2. The method of claim 1, further comprising:
predicting changes to the first CDN; and
sending a message to the CDN indicating the changes, wherein the first message triggers the first CDN generating the request based on the changes.

3. The method of claim 1, wherein the request to switch the first number of clients in the multi-CDN system is generated by the first CDN based on learning of previous traffic variations by the first CDN.

4. The method of claim 1, wherein the request to switch the first number of clients in the multi-CDN system includes requesting, by the first CDN, to offload the first number of clients from the first CDN or onload the first number of clients to the first CDN, and the first CDN generates the request based on statistics of the first CDN.

5. The method of claim 1, wherein facilitating the negotiations between the first CDN and the at least one CDN of the plurality of CDNs includes:
sending the second number and an operation type indicating whether to offload or onload to the first CDN and the at least one CDN.

6. The method of claim 1, wherein determining the second number of clients in the multi-CDN system to be switched includes:
determining a number of buckets on the at least one CDN with closest number of clients to the first number of clients; and
setting the second number of clients based on the number of buckets.

7. The method of claim 6, wherein determining the number of buckets on the at least one CDN with the closest number of clients to the first number of clients includes:

determining no buckets remappable from the first CDN to the at least one CDN; and sending an aborted status of the negotiations to the first CDN and the at least one CDN.

8. The method of claim 6, wherein triggering the first CDN and the at least one CDN to switch the second number of clients between the first CDN and the at least one CDN includes:

remapping the second number of clients from the first CDN to the at least one CDN.

9. The method of claim 1, wherein determining the second number of clients in the multi-CDN system to be switched includes:

setting the first number of clients as the second number of clients.

10. The method of claim 1, wherein:

the operation object is a token identifying the request, including a status code indicating the progress of the negotiations, and status codes indicating the readiness of the first CDN and the at least one CDN.

11. The method of claim 1, wherein facilitating the negotiations between the first CDN and the at least one CDN of the plurality of CDNs includes:

triggering the first CDN and the at least one CDN to evaluate the second number; and triggering the first CDN and the at least one CDN to response to the content steering server indicating accepting the second number, rejecting the second number, or indicating a third number of clients for the negotiations.

12. The method of claim 1, wherein the at least one CDN includes a second CDN and a third CDN, and facilitating the negotiations between the first CDN and the at least one CDN of the plurality of CDNs includes:

distributing the request to the second CDN and the third CDN; and aggregating responses from the second CDN and the third CDN to determine the second number and allocations of the second number of clients to the second CDN and the third CDN.

13. The method of claim 1, wherein triggering the first CDN and the at least one CDN to switch the second number of clients between the first CDN and the at least one CDN includes:

distributing updated steering manifests to the second number of clients specifying updated priorities of URLs to the first CDN and the at least one CDN.

14. The method of claim 1, further comprising:

receiving a message from the first CDN or the at least one CDN rejecting the second number of clients to be switched in the multi-system; and upon receiving the message, aborting the negotiations.

15. The method of claim 1, further comprising:

determining affected loads on the plurality of CDNs in the multi-CDN system; and aborting the negotiations based on the affected loads.

16. The method of claim 1, wherein facilitating the negotiations between the first CDN and the at least one CDN of the plurality of CDNs includes:

selecting the at least one CDN from the plurality of CDNs based on historical negotiation statistics and context.

17. A non-transitory memory storing one or more programs, which, when executed by one or more servers in a multi-CDN system, wherein the multi-CDN system includes a plurality of CDNs serving a plurality of clients, cause the one or more servers to:

receive from a first CDN of the plurality of CDNs a request to switch a first number of clients in the multi-CDN system;

facilitate negotiations between the first CDN and at least one CDN of the plurality of CDNs, including determining a second number of clients in the multi-CDN system to be switched and tracking the negotiations using an operation object obtained by the first CDN, wherein the operation object records the first CDN as a sender of the request, the at least one CDN as a respective responder to the request, the first number of clients, and status indicating progress of the negotiations and readiness of the first CDN and the at least one CDN; and upon successful negotiations, trigger the first CDN and the at least one CDN to switch the second number of clients between the first CDN and the at least one CDN.

18. The non-transitory memory of claim 17, wherein the request to switch the first number of clients in the multi-CDN system is generated by the first CDN based on learning of previous traffic variations by the first CDN.

19. The non-transitory memory of claim 17, wherein the request to switch the first number of clients in the multi-CDN system includes requesting, by the first CDN, to offload the first number of clients from the first CDN or onload the first number of clients to the first CDN, and the first CDN generates the request based on statistics of the first CDN.

20. A content steering server in a multi-CDN system, wherein the multi-CDN system includes a plurality of CDNs serving a plurality of clients, the content steering server comprising:

one or more processors;

a non-transitory memory;

a network interface; and one or more programs, stored in the non-transitory memory, which, when executed by the one or more processors, cause the content steering server to:

receive from a first CDN of the plurality of CDNs a request to switch a first number of clients in the multi-CDN system;

facilitate negotiations between the first CDN and at least one CDN of the plurality of CDNs, including determining a second number of clients in the multi-CDN system to be switched and tracking the negotiations using an operation object obtained by the first CDN, wherein the operation object records the first CDN as a sender of the request, the at least one CDN as a respective responder to the request, the first number of clients, and status indicating progress of the negotiations and readiness of the first CDN and the at least one CDN; and upon successful negotiations, trigger the first CDN and the at least one CDN to switch the second number of clients between the first CDN and the at least one CDN.

* * * * *